United States Patent
Stokich, Jr. et al.

(10) Patent No.: US 6,184,284 B1
(45) Date of Patent: Feb. 6, 2001

(54) ADHESION PROMOTER AND SELF-PRIMING RESIN COMPOSITIONS AND ARTICLES MADE THEREFROM

(75) Inventors: Theodore M. Stokich, Jr.; Brian B. Martin; Paul H. Townsend, III, all of Midland, MI (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/138,510

(22) Filed: Aug. 24, 1998

(51) Int. Cl.$^7$ ................................................ C08J 5/01
(52) U.S. Cl. .................. 524/500; 524/315; 524/366; 524/356; 524/570; 524/588; 524/483; 524/859; 525/105; 525/106; 525/474; 525/479
(58) Field of Search ................. 525/105, 106, 525/474, 479; 524/500, 588, 570, 859, 483, 315, 366, 356

(56) References Cited

U.S. PATENT DOCUMENTS

| | | |
|---|---|---|
| 3,350,345 | 10/1967 | Vanderbilt et al. . |
| 3,922,299 | 11/1975 | Heck . |
| 4,540,763 | 9/1985 | Kirchhoff . |
| 4,642,329 | 2/1987 | Kirchhoff et al. . |
| 4,687,823 | 8/1987 | Kirchhoff et al. . |
| 4,724,260 | 2/1988 | Kirchhoff et al. . |
| 4,730,030 | 3/1988 | Hahn et al. . |
| 4,732,858 | 3/1988 | Brewer et al. . |
| 4,759,874 | 7/1988 | Gros . |
| 4,783,514 | 11/1988 | Kirchhoff et al. . |
| 4,812,588 | 3/1989 | Schrock . |
| 4,826,997 | 5/1989 | Kirchhoff . |
| 4,831,172 | 5/1989 | Hahn et al. . |
| 4,950,583 | 8/1990 | Brewer et al. . |
| 4,973,636 | 11/1990 | Corley . |
| 4,999,449 | 3/1991 | Kirchhoff . |
| 5,002,808 | 3/1991 | Hahn et al. . |
| 5,019,419 | 5/1991 | Matsumoto et al. . |
| 5,025,080 | 6/1991 | Wong . |
| 5,185,391 | 2/1993 | Stokich, Jr. . |
| 5,246,782 | 9/1993 | Kennedy et al. . |
| 5,409,777 | 4/1995 | Kennedy et al. . |
| 5,416,233 | 5/1995 | DeVries et al. . |

FOREIGN PATENT DOCUMENTS

| | | |
|---|---|---|
| 0182163 | 5/1986 | (EP) . |
| 0457351 A2 | 11/1991 | (EP) . |
| 0771830 A2 | 5/1997 | (EP) . |
| 63186762 | 8/1988 | (JP) . |
| 11217490 | 8/1999 | (JP) . |
| WO 9312055 | 7/1993 | (WO) . |
| WO 96/11990 | 4/1996 | (WO) . |
| WO 98/11149 | 3/1998 | (WO) . |

OTHER PUBLICATIONS

Heistand II, R., et al., Cyclotente* 3022 (BCB) for Non–Hermetic Packaging, pp. 584–590, ISHM '92Proceedings
Townsend, P.H., et al., Mat. Res. symp. Proc., vol. 323, Materials Research Society (1994).
Improving the Adhesion of Benzocyclobutene Resins to Various Substrates, Research Disclosure, 873, (1991).
Plueddemann, E.P., Silane Coupling Agents, pp. 49–64, Plenum Press, NY and London.
Walker, P., J. Adhesion Sci. Technol., vol. 5, No. 4, pp. 279–305 (1991).
Gentle, T.E., J. Adhesion Sci. Technol., vol. 6, No. 2. pp. 307–316 (1992).
Derwent abstract for JP 63186762. Mitsuo, Aug. 1988.*

* cited by examiner

Primary Examiner—Robert Dawson
Assistant Examiner—Jeffrey B. Robertson

(57) ABSTRACT

A composition is comprised of the following: a) a hydrolyzed or partially hydrolyzed alkoxysilane; b) a solvent consisting of an organic liquid or mixture of two or more organic liquids in which component (a) and component (c) are soluble and c) a cross linking prepolymer, oligomer, resin or mixtures thereof that forms a low dielectric constant crosslinked polymer. Preferred crosslinked polymers are of a arylcyclobutene or polyphenylene prepolymer, oligomer, resin or mixtures thereof. A coating may be made using the composition wherein the coating is comprised of a crosslinked polymer of a low dielectric crosslinking prepolymer, oligomer, resin or mixture thereof and a hydrolyzed or partially hydrolyzed alkoxysilane, said coating being adhered to a surface of a substrate wherein said surface is comprised of a first material that is a metal, ceramic or polymer and a second material that is (i) a metal, ceramic, or polymer and (ii) different than the first material.

19 Claims, No Drawings

ADHESION PROMOTER AND SELF-PRIMING RESIN COMPOSITIONS AND ARTICLES MADE THEREFROM

BACKGROUND OF THE INVENTION

The present invention relates to a coating composition and more particularly to a solution of a hydrolyzed or partially hydrolyzed alkoxysilane, and a cross-linking polymeric resin (e.g., arylcyclobutene and polyphenylene resin) that produces a low dielectric constant polymer.

Hydrolyzed alkoxysilanes have been used as adhesion promoters or coupling agents for arylcyclobutene resins. However, these alkoxysilanes generally have not successfully coated substrates having surfaces composed of more than one material (e.g., a microelectronic device).

The hydrolyzed alkoxysilanes are typically used as a primer layer, i.e., they are applied to the substrate first, followed by application of the polymeric material. The alkoxysilanes are typically hydrolyzed to form aqueous and/or protic solutions before being applied as thin films. However, many organoalkoxy-silanes are not soluble in water and must be dissolved first in a compatible organic solvent, such as an alcohol. Unfortunately, upon application of the aqueous alkoxysilane/alcohol mixture, a discontinuous film may form which contains voids where the film has not covered the substrate.

It is also known that a hydrolyzed alkoxy-silane can be used as an adhesion promoter primer layer for arylcyclobutene resins. For example, in Proc. MRS, Vol. 323, pg. 365, 1994, *Adhesion of Cyclotene™(BCB) Coatings on Silicon Substrates,* a prehydrolyzed solution of 3-methacryloxypropyltrimethoxysilane (MOPS) in methanol was used as an adhesion promoter for CYCLOTENE™. However, the MOPS solution is extremely difficult to deposit uniformly, forming agglomerates on the surface, which leads to reliability problems when used in fabricated parts.

This is particularly evident when the substrate surface is comprised of more than one material such as a microelectronic device (e.g., integrated circuit, multichip module and flat panel display). A microelectronic device may be comprised of many materials that need to be adhered to by a coating. Materials at the surface of these devices may include, for example, silicon, aluminum, copper, tungsten, silver, gold, platinum, other polymers (e.g., epoxies, polyimides and polyamides), ceramics (e.g., silicas, titanium nitrides, silicon nitrides and silicon oxynitrides).

Currently, polyimide resins are generally the accepted polymeric material employed as thin film dielectrics in the electronics industry. However, polyimide resins tend to absorb water and hydrolyze which can lead to circuit corrosion. Metal ions may migrate into the dielectric polyimide layer requiring a barrier layer between the metal lines and polyimide dielectric. Polyimides may exhibit poor planarization and gap fill properties. Non-fluorinated polyimides may exhibit undesirably high dielectric constants.

Accordingly, it remains highly desirable to provide coating compositions that avoid one or more problems of the prior art such as one of those described above.

SUMMARY OF THE INVENTION

One aspect of the present invention is a coating composition comprising:

a) a hydrolyzed or partially hydrolyzed alkoxysilane, b) a solvent consisting of an organic liquid or mixture of two or more organic liquids in which component (a) and component (c) are soluble and c) a cross linking prepolymer, oligomer, resin or mixtures thereof that forms a low dielectric constant crosslinked polymer. In a preferred embodiment, the alkoxysilane is of the formula:

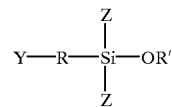

wherein R is $C_1$–$C_6$ alkylidene, $C_1$–$C_6$ alkylene, arylene, or a direct bond; Y is $C_1$–$C_6$ alkyl, $C_2$–$C_6$ alkenyl, aryl, 3-methacryloxy, 3-acryloxy, 3-aminoethyl-amino, or 3-amino; R' is independently in each occurrence $C_1$–$C_6$ alkyl; and Z is $C_1$–$C_6$ alkyl, $C_2$–$C_6$ alkenyl or OR'.

The coating compositions of the present invention offer advantages such as a separate adhesion promoter application step is not required and a coating can be prepared that is uniformly adhered to a substrate where the substrate surface is comprised of more than one material such as an microelectronic device.

In another aspect, the present invention is an article comprising:

(a) a substrate that has a surface comprised of a first material that is a metal, ceramic or polymer and a second material that is (i) a metal, ceramic or polymer and (ii) different than the first material and (b) a coating adhered to the surface of the substrate, the coating being comprised of a crosslinked low dielectric polymer of a crosslinking prepolymer, oligomer, resin or mixtures thereof and a hydrolyzed or partially hydrolyzed alkoxysilane.

Adhered, herein, is when the coating has a bond strength to the substrate of at least about 80 MPa regardless of the material the coating is bonded. Preferably the bond strength is at least about 100 MPa, more preferably at least about 125 MPa and most preferably at least about 200 MPa. Alternatively, adhered is when the coating passes the tape peel test described by ASTM Test Method D3359(B). Generally, the coating fails to pass the tape peel test when any part of the coating has bond strength of less than about 80 MPa.

Different material herein means the first material has a different chemistry than the second material. For example, the materials may be two different metals (e.g., copper and aluminum), two different ceramics (silica; alumina), two different polymers (e.g., polyimide; polyamide), a ceramic;metal, a ceramic;polymer, or a metal;polymer.

The coating compositions of the present invention are useful in a variety of applications, including coatings for multichip modules, flat panel displays and integrated circuits.

DETAILED DESCRIPTION OF THE INVENTION

The alkoxysilanes may be any alkoxysilane or mixture thereof capable of forming a solution with the cross linking prepolymer, oligomer, resin or mixtures thereof (herein referred to as polymer precursors) in an organic liquid. Preferably, the alkoxysilanes are dialkoxy or trialkoxysilanes. More preferably, the alkoxysilanes correspond to the formula (I):

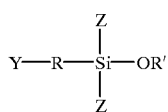

wherein R is $C_1$–$C_6$ alkylidene, $C_1$–$C_6$ alkylene, arylene, or a direct bond; Y is $C_1$–$C_6$ alkyl, $C_2$–$C_6$ alkenyl, aryl, 3-methacryloxy, 3-acryloxy, 3-aminoethylamino, or 3-amino; R' is independently in each occurrence $C_1$–$C_6$ alkyl; and Z is $C_1$–$C_6$ alkyl, $C_2$–$C_6$ alkenyl or OR'.

The term alkylidene refers to aliphatic hydrocarbon radicals wherein attachment occurs on the same carbon. The term alkylene refers to radicals which correspond to the formula —$(C_nH_{2n})$—. The term aryl refers to an aromatic radical, aromatic being defined as containing (4n+2)_ electrons as described in Morrison and Boyd, *Organic Chemistry*, 3rd Ed., 1973. The term arylene refers to an aryl radical having two points of attachment. The term alkyl refers to saturated aliphatic groups such as methyl, ethyl, etc. Alkenyl refers to alkyl groups containing at least one double bond, such as ethylene, butylene, etc. The groups previously described may also contain other substituents, such as halogens, alkyl groups, aryl groups, and hetero groups such as ethers, oximino, esters, amides; or acidic or basic moieties, i.e., carboxylic, epoxy, amino, sulfonic, or mercapto, provided the alkoxysilane remains compatible with the other components of the coating composition.

Preferably the alkoxysilane is a trialkoxy-silane such as 3-methacryloxypropyltrialkoxysilane, 3-aminopropyltrialkoxysilane, 3-aminoethylaminopropyltrialkoxysilane, a vinyltrialkoxysilane, a benzyltrialkoxysilane, a bicycloheptenyltrialkoxysilane, a cyclohexenylethyltrialkoxysilane, a cyclohexyltrialkoxysilane, a cyclopentadienylpropyltrialkoxysilane, a 7-octa-1-enyltrialkoxysilane, a phenethyltrialkoxysilane or an allyltrialkoxysilane. The alkoxysilane is even more preferably 3-methacryloxypropyl-trimethoxysilane, vinyltriacetoxysilane, vinyltrimethoxysilane and vinyltriethyloxysilane. Most preferably the alkoxysilane is vinyltriacetoxysilane.

The alkoxysilanes are preferably hydrolyzed or partially hydrolyzed by the solventless process described hereinafter and can be used directly in the coating compositions. However, some alkoxysilanes hydrolyze so easily that hydrolysis prior to use in the composition of the present invention is not necessary. These alkoxysilanes hydrolyze self-catalytically when used in the composition of the present invention such that upon application to a substrate, the alkoxysilane is hydrolyzed by ambient air humidity. The alkoxysilane may also be hydrolyzed by water present in the solvent, polymer precursors or mixtures thereof contained in the composition. Such alkoxysilanes can be defined as alkoxysilanes which, upon contact with water in the absence of a catalyst, hydrolyze in about 30 minutes or less. Examples of such alkoxysilanes include 3-aminopropyltriethoxysilane and 3-aminoethylaminopropyltriethoxysilane. Alternatively, the hydrolyzed or partially hydrolyzed alkoxysilane can be prepared in a volatile solvent. If desirable, all or most of the solvent may be removed prior to being incorporated into the coating composition of the present invention.

The alkoxysilanes useful in the practice of the present invention can be made by techniques well known in the art such as exemplified in *Encyclopedia of Chemical Technology*, Third Edition, Volume 20, pp. 916–918, 1982 and *Silane Coupling Agents* by Edwin P. Plueddemann, Chapter 2, pp. 30–31, 1982.

The solvent used in the film forming coating composition of the present invention can be any organic liquid or mixture of two or more organic liquids in which the adhesion promoter and the arylcyclobutene are soluble to produce a film forming composition. The solvent is preferably an aprotic solvent or one which is highly immiscible with water. Representative examples of solvents include aromatic hydrocarbons, ketones, esters, ethers or mixtures thereof. Preferably, the solvent is an aromatic hydrocarbon, more preferably toluene, xylene, mesitylene or an alkylnaphthalene and most preferably mesitylene.

The polymer precursor used in the film forming coating compositions may be any capable of forming a solution with the hydrolyzed alkoxysilane in the organic liquid described previously and capable of forming a low dielectric crosslinked polymer after curing. A low dielectric crosslinked polymer is any that is an electrical insulator and has a dielectric constant of at most about 3, preferably at most about 2.5 and most preferably at most about 2.2. However, herein, the low dielectric crosslinked polymer does not include an epoxy, polyimide or polyamide. Crosslinked polymer, herein, is used as understood in the art and described by "cross-linking" in *Hawley's Condensed Chemical Dictionary* $12^{th}$ Edition, Van Nostrand Reinhold Co., New York, N.Y., 1993.

Desirably, the crosslinked polymer is hydrophobic. As an illustration, the crosslinked polymer preferably has a water absorption of at most about 0.5%, more preferably at most about 0.2% and most preferably at most about 0.1% by weight of the crosslinked polymer. The water absorption may be determined by known methods. Generally, the glass transition temperature is at least about 200° C. and more preferably at least about 250° C. It is also desirable that the crosslinked polymer has excellent thermal stability. That is to say, the crosslinked polymer fails to decompose substantially at temperatures less than about 450° C. For example, the crosslinked polymer desirably loses less than 1% of its weight when exposed to a temperature of 400° C. for 24 hours.

Preferred crosslinked polymers include polyphenylenes, polyarylene ethers and crosslinked polymers of arylcyclobutenes. Suitable polyarylene ethers include those known in the art such as described in U.S. Pat. Nos. 5,115,082; 5,155,175 and 5,179,188 and in PCT Wo 91/09081 and EP 0755957-81, each one of these U.S. Patents incorporated herein by reference.

Arylcyclobutenes contain an aryl moiety to which one or more cyclobutene rings are fused. Examples of suitable aryl moieties include benzene, naphthalene, phenanthrene, anthracene, pyridine, a biaryl moiety, or 2 or more aromatic moieties bridged by alkylene or cycloalkylene moieties. Preferred aryl moieties are benzene, naphthalene, biphenyl, binaphthyl, diphenyl alkane or diphenyl cycloalkane moieties. The more preferred aryl moiety is a benzene moiety.

Arylcyclobutenes and methods of making them are well known in the art and are exemplified in U.S. Pat. No. 4,540,763 by Kirchoff, incorporated herein by reference.

Preferred arylcyclobutenes correspond to the formula(II):

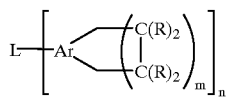

wherein L is a direct bond or bridging member which comprises (1) a polyvalent inorganic radical, or (2) a polyvalent organic moiety which can contain (a) one or more heteroatoms comprising oxygen, sulfur, nitrogen, or phosphorus, or (b) one or more aromatic moieties; Ar is an aromatic radical which may be substituted; R is separately in each occurrence hydrogen or an electron-withdrawing or electron-donating substituent; m is an integer of 1 or 2 and n is an integer from 1 to 5, with the proviso that B can only be a direct bond wherein n is 2.

In a more preferred embodiment, the arylcyclobutene is benzocyclobutene (the aromatic moiety is benzene and m is 1). Preferred benzocyclobutenes correspond to the formula (III):

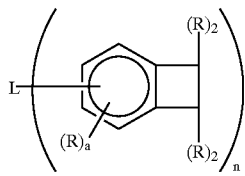

wherein a is separately in each occurrence the integer 0, 1, 2 or 3; and L, R, and n are as defined hereinbefore. These materials are further defined and taught in U.S. Pat. No. 4,642,329 which is incorporated herein by reference.

Additional compounds corresponding to Formula II wherein L contains Si are further defined and taught in U.S. Pat. No. 4,999,449 which is incorporated herein by reference.

Other U.S. Patents which disclose exemplary benzocyclobutene resins include 4,687,823; 4,730,030; 4,759,874; 4,783,514; 4,812,588; 4,826,997; 4,973,636; 5,185,391 and 5,025,080, as well as WO 9312055.

Any suitable polyphenylene may be used in the present invention such as those described by Wrasidlo and Augl, in J. Poly, Sci., Part B (1969) and U.S. Patent Nos. 5,334,668; 5,236,686; 5,169,929 and 5,338,823, each of these patents incorporated herein by reference. Preferably the polyphenylene is one described in U.S. application Ser. Nos. 711, 838 filed Sep. 10, 1996, abandoned, and 834,677 filed Apr. 1, 1997, U.S. Pat. No. 5,965,679, each incorporated herein by reference and as described below. The oligomers and polymers and corresponding starting monomers of the preferred polyphenylenes are as follows.

I. Oligomers and polymers of the general formula:

wherein A has the structure:

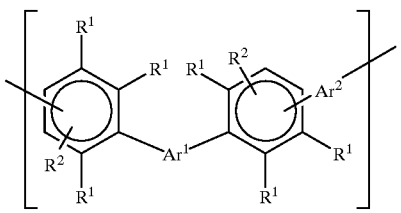

and B has the structure:

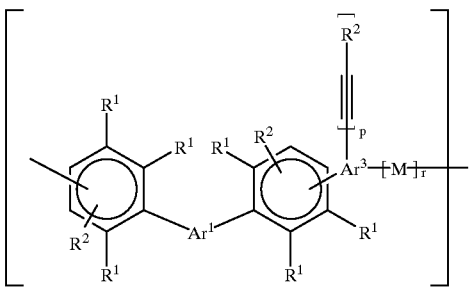

wherein EG are end groups having one or more of the structures:

EG =

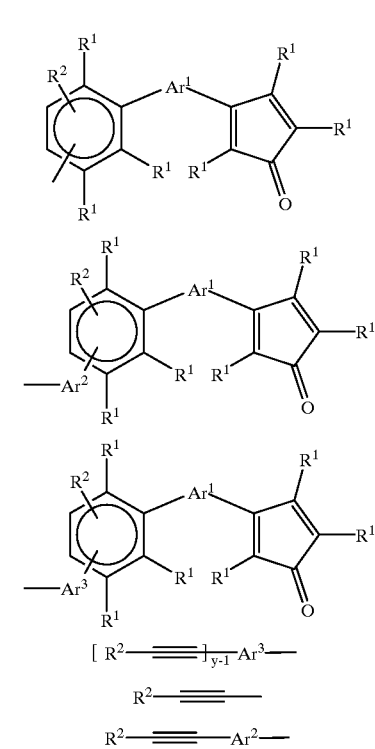

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety, M is a bond, and y is an integer of three or more, p is the number of unreacted acetylene groups in the given mer unit, r is one less than the number of reacted acetylene groups in the given mer unit and p+r=y−1, z is an integer from 0 to about 1000; w is an integer from 0 to about 1000 and v is an integer of two or more.

Such oligomers and polymers can be prepared by reacting a biscyclopentadienone, an aromatic acetylene containing three or more acetylene moieties and, optionally, a polyfunctional compound containing two aromatic acetylene moieties. Such a reaction may be represented by the reaction of compounds of the formulas:

(a) a biscyclopentadienone of the formula:

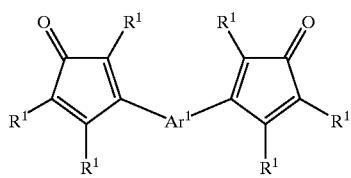

(b) a polyfunctional acetylene of the formula:

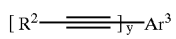

(c) and, optionally, a diacetylene of the formula:

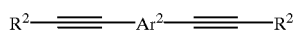

wherein $R^1$, $R^2$, $Ar^1$, $Ar^2$, $Ar^3$ and y are as previously defined.

The definition of aromatic moiety includes phenyl, polyaromatic and fused aromatic moieties. Inertly-substituted means the substituent groups are essentially inert to the cyclopentadienone and acetylene polymerization reactions and do not readily react under the conditions of use of the cured polymer in microelectronic devices with environmental species such as water. Such substituent groups include, for example, F, Cl, Br, —$CF_3$, —$OCH_3$, —$OCF_3$, —O—Ph and alkyl of from one to eight carbon atoms, cycloalkyl of from three to about eight carbon atoms. For example, the moieties which can be unsubstituted or inertly-substituted aromatic moieties include:

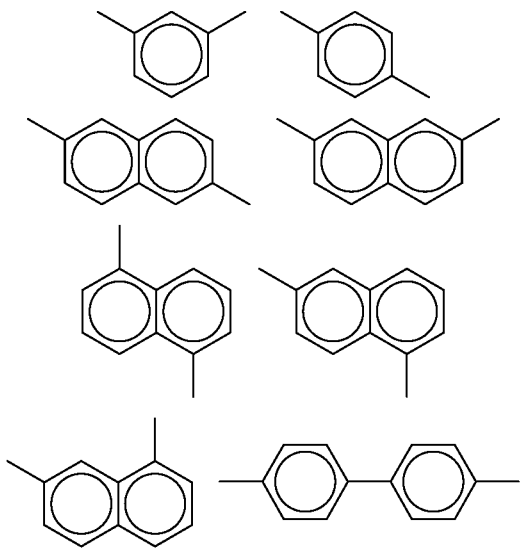

-continued

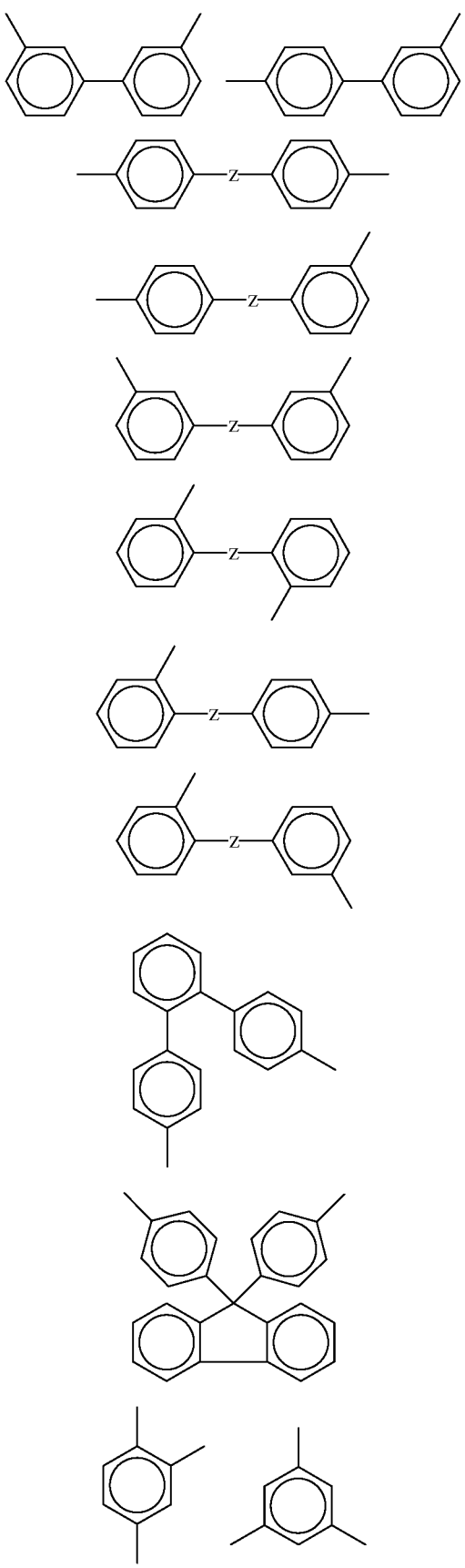

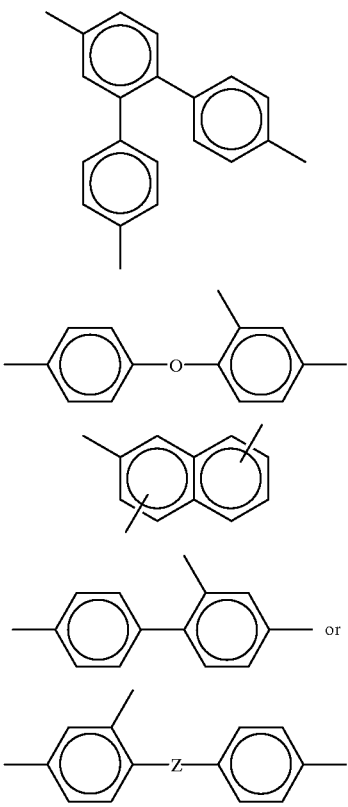
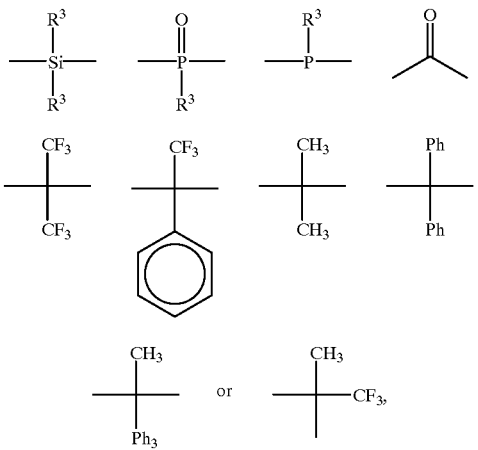
wherein each R³ is independently —H, —CH₃, —CH₂CH₃, —(CH₂)₂CH₃ or Ph. Ph is phenyl.
II. Polyphenylene oligomers and polymers of the general formulas:
wherein Z can be: —O—, —S—, alkylene, —CF₂—, —CH₂—, —O—CF₂—, perfluoroalkyl, perfluoroalkoxy,
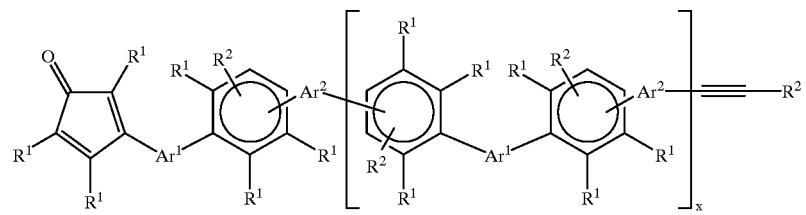
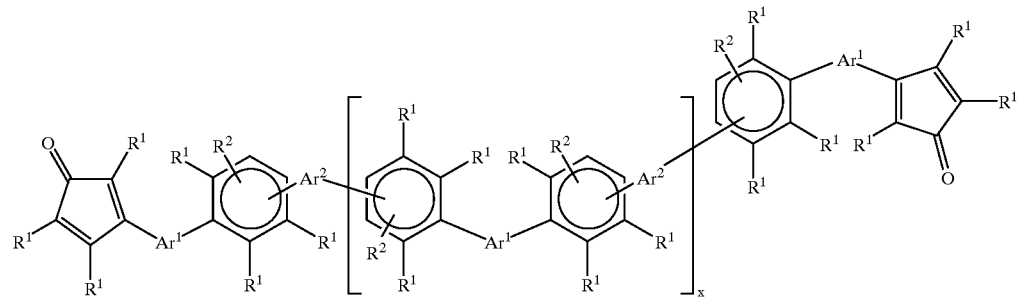

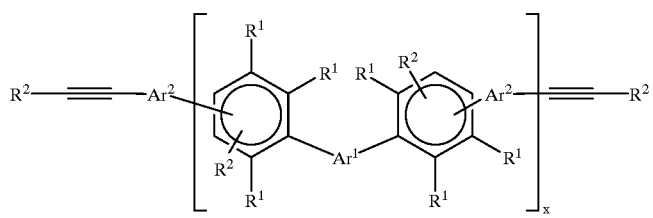

wherein $R^1$, $R^2$, $Ar^1$ and $Ar^2$ are as defined previously; and x is an integer from 1 to about 1000. Preferably, x is from 1 to about 50 and more preferably from 1 to about ten. Such oligomers and polymers can be prepared by the reaction of a biscyclopentadienone and a diacetylene of the general formulas:

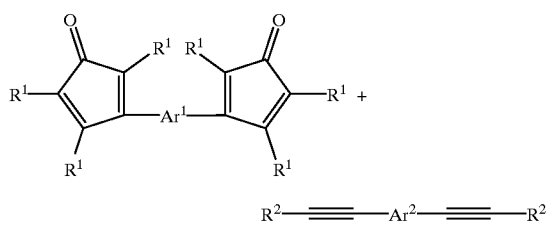

wherein $R^1$, $R^2$, $Ar^1$ and $Ar^2$ are as previously defined.

III. Polyphenylene oligomers and polymers represented by the formula:

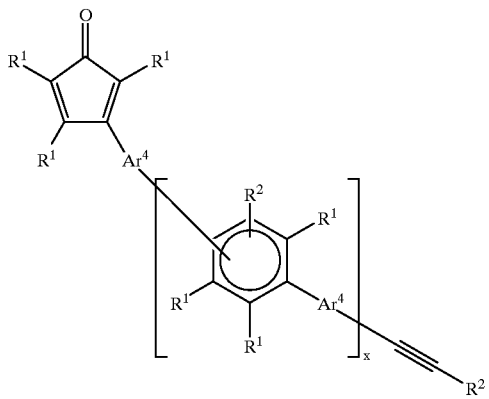

wherein $Ar^4$ is an aromatic moiety or an inertly-substituted aromatic moiety, $R^1$, $R^2$, and x are as previously defined, as can be prepared by the reaction of the cyclopentadienone functionality and the acetylene functionality of a polyfunctional compound of the general formula:

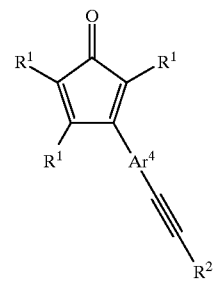

wherein $R^1$, $R^2$ and $Ar^4$ are as defined previously.

IV. Polyphenylene oligomers and polymers represented by the formula:

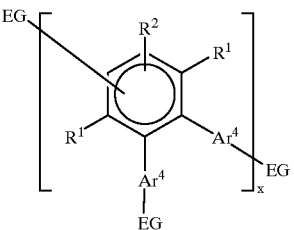

wherein EG is represented by any one of the formulas:

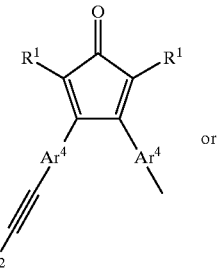 or

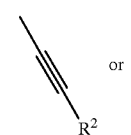 or

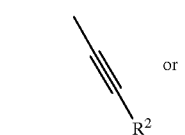

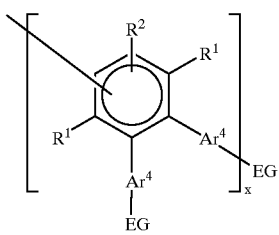

wherein $R^1$, $R^2$, $Ar^4$ and x are as defined previously, as can be prepared by the reaction of the cyclopentadienone functionality and the acetylene functionality of a polyfunctional compound of the general formula:

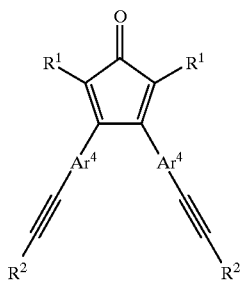

wherein $R^1$, $R^2$, and $Ar^4$ are as defined previously.

A polyfunctional compound containing two or more aromatic cyclopentadienone moieties may be made by the condensation of benzils with benzyl ketones using conventional methods. Exemplary methods are disclosed in Kumar et al. Macromolecules, 1995, 28, 124–130; Ogliaruso et al., J. Org. Chem., 1965, 30, 3354; Ogliaruso et al., J. Org. Chem., 1963, 28, 2725; and U.S. Pat. No. 4,400,540; all of which are incorporated herein by reference.

A polyfunctional compound containing two or more aromatic acetylene moieties may be made by conventional methods. An aromatic compound may be halogenated and then reacted with the appropriate substituted acetylene in the presence of an aryl ethynylation catalyst to replace the halogen with the substituted acetylene compound.

Once the polyfunctional compound monomers are made, they are preferably purified. In particular, in preparation for use as an organic polymer dielectric, metals and ionic species are removed. For example, the polyfunctional compounds containing aromatic acetylene groups may be contacted with a water wash, an aliphatic hydrocarbon solvent and then dissolved in an aromatic solvent and filtered through a purified silica gel. This treatment can remove residual ethynylation catalyst. Additional recrystallizations may also help in removal of undesired impurities.

While not intended to be bound by theory, it is believed that the polyphenylene oligomers and polymers are formed through the Diels Alder reaction of the cyclopentadienone groups with the acetylene groups when the mixtures of cyclopentadienones and acetylenes in solution are heated. These oligomers may contain cyclopentadienone and/or acetylene end groups and/or pendant groups. Upon further heating of the solution or an article coated with the solution, additional chain extension can occur through the Diels Alder reaction of the remaining cyclopentadienone end groups with the remaining acetylene groups resulting in an increase in molecular weight. Depending on the temperature used, reaction of the acetylene groups with each other may also occur.

The oligomers and polymers are shown in the structures as having either cyclopentadienone and/or acetylene end groups and/or pendant groups. In general, the end groups will depend on the relative concentration of cyclopentadienone to Diels Alder reactive acetylene functionality employed in the reaction, with a stoichiometric excess of cyclopentadienone functionality giving more cyclopentadienone end groups and a stoichiometric excess of Diels Alder reactive acetylene functionality giving a greater proportion of acetylene end groups.

Mixtures or copolymers of two or more different arylcyclobutenes or polyphenylenes may also be employed. In addition, the composition can contain other monomers copolymerizable with the arylcyclobutene or polyphenylene. For example, the arylcyclobutene may be copolymerized with other monomers such as ethylenically unsaturated monomers, e.g., styrenes, acrylates, divinylbenzene, and methacrylates, acetylenic monomers, e.g., phenyl acetylene and diphenyl acetylene, and other monomers capable of polymerization with the arylcyclobutene.

The arylcyclobutene and polyphenylene may be used in the form of a monomer, an oligomer, a polymerized or copolymerized resin, a prepolymer, i.e., a partially polymerized or copolymerized arylcyclobutene or polyphenylene having reactive polymerization sites which provide for further polymerization, or mixtures thereof (i.e., polymer precursors) in forming the crosslinked low dielectric constant polymer of the coating composition.

The coating compositions may also contain other additives to impart other useful properties to the film forming compositions. Such additives include but are not limited to photocrosslinking agents such as bis(arylazides), e.g., 2,6-bis(4azidobenzylidene)-4-ethylcyclohexanone or 2,2-bis(4-(4-azidophenoxy)phenyl)propane, energy transfer agents (exemplified in WO 9312055), anti-oxidants (exemplified in U.S. Pat. No. 5,185,391) and the like.

The amounts of the alkoxysilane, solvent, and polymer precursors employed in the coating composition is dependent upon a number of factors including the specific end-use application and the properties desired. One such application is an adhesion promoter primer coating. As mentioned, a promoter primer coating provides adhesive bonding between the surface to which it is applied and a subsequently applied coating layer. Alternatively, the composition is a self-priming coating. In such a case, the hydrolyzed alkoxysilane functions to provide adhesive bonding between the surface to which the self priming formulation is applied and the resultant film. In addition, it can also provide adhesive bonding to a subsequently applied surface. In general, a primer composition normally will contain lesser amounts of the cross linking prepolymer, oligomer, resin or mixtures thereof than when the composition is used as a self-priming composition.

In general, regardless of its intended end-use, the composition comprises from about 0.01 to about 10 weight percent hydrolyzed alkoxysilane, from about 10 to about 99.9 weight percent solvent, and from about 0.01 to about 90 weight percent cross linking prepolymer, oligomer, resin or mixtures thereof, said weight percents being based on the total weight of the composition.

In general, when applied as an adhesion promoter primer coating application, the composition comprises from about 0.01, more preferably from about 0.2, most preferably from about 0.3 weight percent, to about 10, more preferably about 5, and most preferably to about 2.5 weight percent of hydrolyzed alkoxysilane; from about 75, more preferably about 90, and most preferably about 92.5 weight percent to about 99.9, more preferably about 99.5, and most preferably about 98 weight percent of solvent, and from about 0.01, more preferably from about 1, and most preferably from about 2 weight percent to about 20, more preferably about 10, and most preferably about 5 weight percent of polymer precursors, said weight percents being based on the total weight of the composition.

Alternatively, when employed as a self-priming coating application, the composition comprises from about 0.01, more preferably from about 0.2, and most preferably from about 0.5 weight percent to about 5, more preferably to about 3, and most preferably to about 1 weight percent of hydrolyzed alkoxysilane; from about 10, more preferably from about 20, and most preferably from about 35 weight percent to about 95, more preferably to about 90 and most preferably to about 80 weight percent of solvent; and from about 5, more preferably from about 10, and most preferably from about 20 weight percent to about 90, more preferably to about 80, and most preferably to about 65 weight percent of cross linking prepolymer, oligomer, resin or mixtures thereof, said weight percents being based on the total weight of the composition.

While the coating compositions can be applied using any of the techniques well known in the art, such as spray, brush, dip, meniscus, extrusion, capillary, curtain, roll coating and the like, they are advantageously applied at room temperature using conventional spin-coating techniques.

In this application, the coating composition can be used as an adhesion promoter primer layer or as a self-priming polymer layer. Typical thicknesses for adhesion promoter primer layers are between about 30 to about 1000 Angstroms, whereas the thickness of the self-priming polymer layer can vary from about 0.1 to about 25 microns. Multiple layers may be prepared using the composition either as an adhesion promoter primer or a self-priming polymer layer. The multi-layer coatings typically range between about 10 to about 500 microns and are preferably from about 50 to about 200 microns. The coating compositions of the present invention may also be subsequently coated with other polymeric materials such as arylcyclobutene or polyphenylene polymers and copolymers or any other polymeric material which will bond with the coating composition.

After being applied, the coating compositions can be crosslinked, photocrosslinked, cured or soft cured. Photodefineable low dielectric constant polymers are typically photocrosslinked prior to further cure. Conventional curing techniques such as electron beam, ultra violet, thermal radiation, or convection can also be employed.

The degree of polymerization will depend upon the application involved. For instance, when additional layers will be applied, a soft cure or crosslinking of about 80 to 85 percent (as measured, for example, by FTIR) is preferred and can be accomplished, for example, by heating at about 220° C. for about 30 minutes. In the final stage of curing, crosslinking of more than about 95 percent can be achieved, for example, by heating at 250° C. for about 1 hour.

The alkoxysilane used in the coating composition of the present invention is preferably prepared using a solventless process in which the alkoxysilane is contacted with a sufficient amount of water to hydrolyze at least one alkoxy group. Optionally, an acidic or basic catalyst is also employed.

The alkoxysilanes used in the process of hydrolysis can be any alkoxysilane which has no groups sufficiently acidic or basic to catalyze the hydrolysis reaction. Preferably, the alkoxysilanes are those which have been described previously in Formula (I), with the proviso that R is not 3-aminoethylamino or 3-amino and R, Y, and Z may only be further substituted with moieties which are substantially inert or nonreactive in the hydrolysis reaction. Examples of such inert substituents include but are not limited to halogens, alkyl, and aryl groups. More preferably, the alkoxysilane is a trialkoxysilane and is even more preferably 3-methacryloxypropyltrimethoxysilane, vinyltriacetoxysilane, vinyltrimethoxysilane and vinyltriethyloxysilane. Most preferably the alkoxysilane is vinyltriacetoxysilane.

The amount of water most advantageously employed in the hydrolysis reaction is dependent upon a variety of factors including the degree of hydrolysis desired and the rate of attaining that degree of hydrolysis. To achieve complete hydrolysis, a stoichiometric amount of water to completely hydrolyze the alkoxysilane is 1 molar equivalent of water for each molar equivalent of alkoxy group present on the alkoxysilane. In practice, less than a stoichiometric amount of water is required for complete hydrolysis since water is formed by condensation reactions during the hydrolysis. The amount of water used for desired hydrolysis in the present invention is preferably no more than a stoichiometric amount. Preferably from about 10 percent to about 80 percent of the stoichiometric amount of water needed for total hydrolysis is used, more preferably from about 30 percent to about 60 percent and most preferably about 40 percent.

The water used in the hydrolysis should be purified. Preferably, the water is deionized.

The optional, but generally preferred, acidic or basic catalysts may be any acidic or basic compound which will catalyze the hydrolysis of the alkoxysilane. Examples of acidic catalysts include but are not limited to hydrochloric acid, acetic acid, sulfuric acid, trifluoroacetic acid, chloroacetic acid, methane sulfonic acid, and phosphoric acid. Examples of basic catalysts include but are not limited to potassium hydroxide, sodium hydroxide, and 3-aminopropyltrialkoxysilanes. More advantageously, the catalyst is acidic. Preferably, the acidic catalyst is hydrochloric acid, acetic acid, sulfuric acid, trifluoroacetic acid, methane sulfonic acid, or phosphoric acid. More preferably, the catalyst is hydrochloric acid, acetic acid, sulfuric acid, trifluoroacetic acid or phosphoric acid, and most preferably hydrochloric acid or acetic acid.

The catalyst is used in amounts sufficient to catalyze the hydrolysis reaction. The amount of catalyst most advantageously employed will depend upon a number of factors including the desired rate of hydrolysis, the catalyst, the alkoxysilane used, and the degree of hydrolysis desired. Preferably, the catalyst is present in amounts from about 0 ppm to about 50 ppm based on the amount of hydrolyzed alkoxysilane. More preferably, the catalyst, when present, is present in amounts from about 2 ppm to about 40 ppm and most preferably between about 4 ppm to about 30 ppm, based on the amount of hydrolyzed alkoxysilane.

Hydrolysis of alkoxysilanes produces a mixture of nonhydrolyzed, partially hydrolyzed, fully hydrolyzed and oligomerized alkoxysilanes. oligomerization occurs when a hydrolyzed or partially hydrolyzed alkoxysilane reacts with another alkoxysilane to produce water and an Si—O—Si bond. As used herein, the term "hydrolyzed alkoxysilane" encompasses any level of hydrolysis, partial or full, as well as oligomerized.

In hydrolyzing the alkoxysilane, the alkoxysilane, water, and optional catalyst are mixed until the desired hydrolysis is complete. While the time to complete hydrolysis will vary depending on a number of factors, including the specific reactants employed, in general, hydrolysis is complete in a time from about 2 minutes to about 5 hours, preferably for about 4 minutes to about 2 hours, and more preferably for about 10 minutes to about 1 hour.

The alkoxysilane, water, and catalyst initially may form a two-phase mixture which upon agitation and continuation of the hydrolysis reaction, becomes a single phase. The time required to form a single phase is dependent upon the alkoxysilane used and the temperature at which the ingredients are mixed; with less time being required at higher temperatures. Depending upon the catalyst type, its concentration and the alkoxysilane used, hydrolysis may be complete by the time a single phase is obtained, or additional time may be required to complete hydrolysis. In general, the mixture is agitated for about 10 minutes to about 2 hours after a single phase is obtained to complete the hydrolysis reaction. The temperature at which hydrolysis is conducted is preferably from about 15° C. to about 100° C., more preferably from about 20° C. to about 50° C. and most preferably from about 20° C. to about 25° C. Hydrolysis rates increase with increasing temperatures.

Alternatively, the hydrolysis may be conducted in the absence of a catalyst. In this procedure, the alkoxysilane is mixed with water and stirred for a sufficient period of time for the desired extent of hydrolysis to occur. This method may take up to several days dependent upon the alkoxysilane and the temperature at which hydrolysis occurs. In some applications this method may be preferred when residual catalyst levels have an adverse effect on subsequent use of the alkoxysilane.

In coating articles for use in electronics applications such as multichip modules, flat panel displays, integrated circuits, and the like, it has been surprisingly discovered that a coating comprising the crosslinked low dielectric constant polymer of a crosslinking prepolymer, oligomer, resin or mixture thereof and a hydrolyzed or partially hydrolyzed alkoxysilane may be adhered to a surface of a substrate comprised of a first material that is a metal, ceramic or polymer and a second material that is (i) a metal, ceramic or polymer and (ii) different than the first material.

Exemplary metals include aluminum, copper, tungsten, gold, platinum, silver, titanium and chrome. Exemplary ceramics include alumina, silica, MgO, BeO, including spinels, aluminum nitride, boron nitride, silicon nitride, titanium nitride, gallium arsenide; and glasses such as fiber glass, lime glass, flint glass, borosilicate glass, PYREX® and VYCOR®. Exemplary polymers include those described herein and polyimides, epoxies and polyamides.

In particular and surprisingly, the coating is adhered to a surface, of a substrate, comprised of silicon or thermally oxidized silicon (i.e., first material) and a metal such as aluminum or copper (i.e., second material). The substrate surface may even be comprised of other materials including, for example, aluminum nitride, silicon nitride, silicon oxynitride, titanium nitride, tungsten and other materials used to fabricate microelectronic devices. The substrate surface may even be comprised of silicon, copper and aluminum.

The following examples are set forth to illustrate the present invention and should not be construed to limit its scope. In the examples, all parts and percentages are by weight unless otherwise indicated.

EXAMPLE 1

12.5 g (0.0503 mol) of 3-Methacryloxypropyltrimethoxysilane (MOPS) containing 29 ppm HCl, and 1.09 g (0.0604 mol) deionized and microfiltered water (pH 6.8) (40 percent of theoretical needed for complete hydrolysis) is combined in a 2 oz. bottle. The two-phase mixture is agitated at 23° C. Hydrolysis proceeds and a single phase is produced in 8 minutes. Proton NMR (DCC13; by measuring methanol by-product formation) indicates that hydrolysis is complete in an additional 8 to 15 minutes. At 15, 30, and 60 minute reaction times, 1.0 g samples are removed and diluted with 39.0 g methanol to give solutions at 2.5 weight percent solids.

Approximately 10 mLs of the solution are dispensed with a syringe through a 0.5 micron filter onto oxidized silicon wafers rotating at 3000 RPM. The morphology of the resulting residue is observed with optical microscopy. CYCLOTENE™ 3022 resin, (a formulation manufactured by The Dow Chemical Company of tetramethyldivinylsiloxane bisbenzocyclobutene resin in mesitylene containing 4.0 weight percent (based on solids) AGERITE™ MA antioxidant (manufactured by B. F. Goodrich)) is subsequently applied at a thickness of 10 microns, and cured at 250° C. for one hour. Delamination of the cured coatings is evaluated by microindentation (as described in *The Determination of Bond Strength of Polymeric Films by Indentation Debonding* by H. D. Conway and J. P. R. Thomsin, in J. Adhesion Sci. Technol. 3, 227, 1988). Values of bond strength are obtained from the level of delamination observed by optical microscopy.

The effects of water level and reaction time on adhesion performance of methanol-based hydrolyzed MOPS adhesion promoters were observed. After application of the adhesion promoter, the morphology of the deposited residue was discontinuous, appearing in the form of droplets.

In a similar fashion, adhesion promoter samples are prepared based on water levels which corresponded to 20, 60, 80, and 100 percent hydrolysis. Results are given in Table I.

TABLE I

| Water (%) | Reaction Time (min) | Morphology | Adhesion (MPa) |
|---|---|---|---|
| 20 | 15 | droplets | 187 ± 3.9 |
| 20 | 30 | droplets | 172 ± 11.6 |
| 20 | 60 | droplets | 171 ± 3.1 |
| 40 | 15 | droplets | 187 ± 7.7 |
| 40 | 30 | droplets | 192 ± 2.4 |
| 40 | 60 | droplets | 191 ± 7.7 |
| 60 | 15 | droplets | — |
| 60 | 30 | droplets | 178 ± 8.2 |
| 60 | 60 | droplets | 152 ± 8.7 |
| 80 | 15 | droplets | 172 ± 3.8 |
| 80 | 30 | droplets | 162 ± 12.9 |
| 80 | 60 | droplets | 141 ± 9.7 |
| 100 | 15 | droplets | 126 ± 3.9 |
| 100 | 30 | droplets | 118 ± 3.7 |
| 100 | 60 | droplets | 124 ± 3.7 |
| No Promoter | | No promoter | 73 ± 4.8 |

EXAMPLE 2

A partially hydrolyzed MOPS is prepared using the same techniques used in Example 1 (40 percent water). After 1 hour reaction time at ambient temperature, portions of the neat hydrolyzed alkoxysilane are added to 5 percent solutions of CYCLOTENE™ 3022 in mesitylene to yield a series of adhesion promoter solutions in amounts to give solutions containing 0.5, 1.0, 2.5, and 5.0 percent of the hydrolyzed alkoxysilane. Each solution is evaluated for processability and adhesion performance to thermally oxidized silicon wafers (microindentation). Results are given in Table II.

TABLE II

| Hydrolyzed MOPS Concentration (wt %) | Film-Forming Ability | Adhesion (MPa) |
| --- | --- | --- |
| 0.5 | film-forming | 206 ± 4.0 |
| 1.0 | film-forming | 183 ± 8.1 |
| 2.5 | film-forming | 184 ± 6.6 |
| 5.0 | film-forming | 198 ± 3.0 |
| 2.5% in isopropanol | droplets | 195 ± 6.2 |
| 2.5% in methanol | droplets | 204 ± 6.5 |

Hydrolyzed MOPS adhesion promoter formulations containing CYCLOTENE™ 3022 in mesitylene provide film forming compositions with good adhesion performance.

EXAMPLE 3

A partially hydrolyzed MOPS is prepared using the same conditions used in Example 1 (40 percent water). After 1 hour reaction time at 23° C., 0.10 g (0.1 weight percent) of the neat partially hydrolyzed MOPS is added to 100.0 g of the following dry etchable BCB formulation:

63.00 g 1,3-bis(2-bicyclo(4.2.0)octa-1,3,5-trien-3-ylethenyl)-1,1,3,3-tetramethyl disiloxane resin 2.63 g (poly)-1,2-dihydro-2,2,4-trimethylquinoline 34.37 g mesitylene The adhesion promoter and dry etchable BCB solution are shaken and allowed to stand until bubbles from the agitation are gone. This produces a self-primed dry etchable formulation with 0.1 percent of the adhesion promoter.

Additional self-primed dry etchable formulations with 0.2, 0.5, and 1.0 percent of the adhesion promoter are prepared similarly by adding the appropriate amount of the neat partially hydrolyzed MOPS to 100.0 g samples of the dry etchable BCB formulation defined above.

The dry etchable formulations are spin coated on 4 inch silicon wafers containing thermal oxide. Control formulations are also run containing no adhesion promoter (Comparative Examples). The wafers are then cured under nitrogen using the following ramped cure schedule: 5 minutes from approximately 23° C. to 100° C., 15 minutes at 100° C.; 15 minutes from 100° C. to 150° C.; 15 minutes at 150° C.; 60 minutes from 150° C. to 210° C.; 40 minutes at 210° C.

Adhesion performance is measured by microindention measurements. Results are given in Table III.

TABLE III

| Hydrolyzed MOPS Concentration (wt %) | Film Thickness (μm) | Adhesion (MPa) |
| --- | --- | --- |
| 0* | 10.4 | 67.6 ± 5.9 |
| 0* | 10.2 | 68.4 ± 2.5 |
| 0.1 | 10.3 | 156.3 ± 3.4 |
| 0.1 | 10.6 | 164.9 ± 6.0 |
| 0.2 | 10.6 | 153.1 ± 4.5 |
| 0.2 | 10.4 | 163.6 ± 2.8 |
| 0.5 | 9.5 | 158.9 ± 3.8 |
| 0.5 | 10.3 | 177.9 ± 1.7 |
| 1.0 | 10.5 | 177.2 ± 4.2 |
| 1.0 | 10.7 | 183.9 ± 7.9 |

TABLE III-continued

| Hydrolyzed MOPS Concentration (wt %) | Film Thickness (μm) | Adhesion (MPa) |
| --- | --- | --- |

*Comparative Examples

A self-priming CYCLOTENE™ 3022 formulation containing hydrolyzed MOPS adhesion promoter has considerably improved adhesion performance.

EXAMPLE 4

A partially hydrolyzed MOPS is prepared using the same conditions used in Example 1 (40 percent water). After 1 hour reaction time at ambient temperature, 0.084 g portions of the neat hydrolyzed MOPS are added to the following photosensitive BCB formulation:

| 14.93 g | 1,3-bis (2-bicyclo(4.2.0)octa-1,3,5-trien-3-ylethenyl)-1,1,3,3-tetramethyl disiloxane resin |
| --- | --- |
| 0.31 g | 2,6-bis (4-azidobenzylidene)-4-methylcyclohexanone |
| 0.116 g | 4,4'-diazidophenyl sulfone |
| 0.116 g | 1,2-dihydro-2,2,4-trimethylquinoline |
| 17.3 g | mesitylene |

The adhesion promoter and photosensitive BCB solution were shaken and allowed to stand until bubbles from the agitation were gone. This produces a self-priming photosensitive formulation with 0.5 percent of the hydrolyzed MOPS coupling agent. This solution is compared to the unprimed solution for stability, processability, and adhesion performance to thermally oxidized silicon wafers (microindention) (Comparative Example). Results are given in Table IV.

TABLE IV

| Hydrolyzed MOPS Concentration (wt %) | Film Thickness (μm) | Adhesion (MPa) |
| --- | --- | --- |
| 0.5 | 11.91 | 291 ± 9.0 |
| 0.5 Comparative Example | 11.96 | 289 ± 4.7 |
| 0 | 11.71 | 98 ± 3.3 |
| 0 | 11.84 | 101 ± 1.6 |

Self-priming photodefineable benzocyclobutene formulations containing hydrolyzed MOPS adhesion promoter provide substantial adhesion enhancement.

EXAMPLE 5

12.5 g (0.0503 mol) of 3-Methacryloxypropyltrimethoxysilane (MOPS), 1.09 g (0.0604 mol) of 0.01 N aqueous HCl and 40 percent of the theoretical amount of deionized and microfiltered water (pH 6.8) needed for total hydrolysis are combined in a 2 oz. bottle. This acid level represents 30 ppm HCl in the hydrolyzed MOPS. The two-phase mixture is stirred at ambient temperature (23° C.). Hydrolysis proceeds such that a single phase is produced in 8 minutes. In the absence of the 30 ppm HCl, the mixture does not clear to one phase (little or no reaction) even after 48 hours.

The experiment is repeated using 0.0050 N (15 ppm HCl) and 0.0025 N HCl (7.5 ppm HCl) and 0.0100, 0.0050, and 0.0025 N $H_2SO_4$. Results are given in Table V.

TABLE V

| Acid Concentration | Time to Form Single Phase (min) | |
|---|---|---|
| (N) | HCl | $H_2SO_4$ |
| 0.0100 | 8 | 8 |
| 0.0050 | 14 | 20 |
| 0.025 | 44 | 75 |

The experiment is repeated to define the hydrolysis temperature, HCl catalyst level, time required to form a single phase and time required for complete hydrolysis (40 percent of theoretical). Proton NMR is used to measure time for complete hydrolysis; single phase times are observed visually. Results are given in Table VI.

TABLE VI

| HCl conc. (ppm) | Reaction Temp. (° C.) | Single Phase (min.) | Complete Hydrolysis (min.) |
|---|---|---|---|
| 0 | 23 | 4320 | 8640 |
| 0 | 40 | 1140 | 2460 |
| 6 | 23 | 40 | 60 |
| 15 | 23 | 15 | 60 |
| 30 | 23 | 8 | 40 |
| 30 | 30 | 5 | 30 |
| 30 | 35 | 4 | 40 |

The single phase and complete hydrolysis columns refer to the amount of time-required to reach these conditions.

Although hydrolysis will occur in the absence of HCl, the reaction time is significantly shortened by the presence of trace amounts of HCl. The reaction temperature also greatly effects the time needed for the hydrolysis reaction, wherein higher temperatures decrease the amount of time significantly.

EXAMPLE 6

12.5 g (0.0565 mol) of 3-Aminopropyl-triethoxysilane (3-APS) and 1.22 g (0.0678 mol) deionized and microfiltered water (pH 6.8; 40 percent of theoretical needed for total hydrolysis) are combined in a 2 oz. bottle. The two-phase mixture is stirred magnetically at ambient temperature (23° C.). Hydrolysis proceeds such that a single phase is produced in about 60 minutes. Proton NMR (DMSO-$d_6$; by following ethanol formation) indicates that hydrolysis is essentially complete at 60 minutes. This material is used to make a self-priming formulation similar to that of Example 3.

EXAMPLE 7

11.87 g (0.0478 mol) of 3-Methacryloxypropyltrimethoxysilane (MOPS), 0.56 g (0.00251 mol) of 3-aminopropyltriethoxysilane (3-APS); (MOPS/3-APS=95/5 mol ratio) and 1.08 g (0.0604 mol) of deionized and microfiltered water (pH 6.8; 40 percent of theoretical needed for total hydrolysis) are combined in a 2 oz. bottle. The two-phase mixture is stirred at ambient temperature (23° C.). Hydrolysis proceeds such that a single phase is produced in 25 minutes. Proton NMR (DMSO-$d_6$; by following ethanol formulation) indicates that hydrolysis is essentially complete at 30 minutes.

EXAMPLE 8

10.0 g (0.0657 mol) Vinyltrimethoxysilane and 1.46 g (0.0811 mol) aqueous 0.01N HCl, and 40 percent of the theoretical amount needed for total hydrolysis of deionized and microfiltered water (pH 6.8); are combined in a 2 oz. bottle. The two-phase mixture is stirred at ambient temperature (23° C.). Hydrolysis proceeds such that a single phase is produced in 1 minute. Proton NMR ($DCCl_3$) indicates that hydrolysis is essentially complete in 20 minutes.

A film forming formulation is prepared as in Example 2 using 2.5 percent of the 40 percent hydrolyzed vinyltrimethoxysilane, 5.0 percent CYCLOTENE™ 3022, and 92.5 percent of mesitylene. The solution is evaluated for processability and adhesion performance to thermally oxidized silicon wafers by microindentation as in Example 2.

The formulation is film forming and adhesion is 244 MPa.

EXAMPLE 9

10.0 g (0.0616 mol) of Allyltrimethoxysilane 1.33 g (0.0739 mol) aqueous 0.01 N HCl and 40 percent of the theoretical amount needed for total hydrolysis of deionized and microfiltered water (pH 6.8); are combined in a 2 oz. bottle. The two-phase mixture is stirred at ambient temperature (23° C.). Hydrolysis proceeds such that a single phase is produced in 3 minutes. Proton NMR ($DCCl_3$) indicates that hydrolysis is essentially complete in 60 minutes.

A film forming adhesion promoter formulation is prepared as in Example 8 using 2.5 weight percent of the 40 percent hydrolyzed allyltrimethoxysilane, 5.0 weight percent CYCLOTENE™ 3022, and 92.5 weight percent of mesitylene. The solution is evaluated for processability and adhesion performance to thermally oxidized silicon wafers by microindentation as in Example 2.

The formulation is film forming and the adhesion is 147 MPa.

EXAMPLE 10

The following formulation is made to hydrolyze the methyl esters on 3-methacryloxypropyltrimethoxy-silane (MOPS):

| | |
|---|---|
| 48.06 g | MOPS |
| 48.06 g | Methanol |
| 4.81 g | Water |
| 0.96 g | Trifluoroacetic Acid |

The formulation is allowed to stand at room temperature for 24 hours then filtered through Strong Base Resin Ion Exchange Beads (DOWEX™ SBR-OH Anion OH− Exchange Resin manufactured by The Dow Chemical Company) to remove the trifluoroacetic acid. 90.35 g of methanol is added during the filtration to rinse the solution from the beads completely. This material is placed in a vacuum evaporation flask in a warm water bath and the methanol is removed to leave the residual hydrolyzed MOPS. The hydrolyzed MOPS is added at 0.5 weight percent relative to solids to a 63 percent solids formulation of CYCLOTENE™ 3022 in mesitylene. The resultant self-primed solution is deposited by spin-coating onto a thermally oxidized silicon wafer to a thickness of 12.4 $\mu$m. The adhesion is measured by microindentation and measures 160.5 MPa±4.2 MPa. This value is an improvement when compared with typical values of 70 MPa obtained with non-primed resin.

EXAMPLE 11

A partially hydrolyzed MOPS is prepared using the same conditions used in Example 1 (40 percent water). After 1 hour reaction time at 23° C., 0.20 g (0.2 weight percent) of the neat partially hydrolyzed MOPS is added to 100.0 g of the following photosensitive BCB formulation:

| 45.00 g | 1,3-bis(2-bicyclo(4.2.0)octa-1,3,5-trien-3-ylethenyl)-1,1,3,3-tetramethyl disiloxane resin |
| --- | --- |
| 1.12 g | 2,6-bis(4-azidobenzylidene)-4-ethylcyclohexanone |
| 1.47 g | (poly)-1,2-dihydro-2,2,4-trimethylquinoline |
| 52.41 g | mesitylene |

The adhesion promoter and photosensitive BCB solution are shaken and allowed to stand until bubbles from the agitation are gone. This produces a self-primed photosensitive formulation with 0.2 percent of the adhesion promoter.

A second self-primed photosensitive formulation with 0.5 percent of the adhesion promoter is prepared similarly by adding 0.50 g of the neat, partially hydrolyzed MOPS to a second 100.0 g sample of the photosensitive BCB formulation defined above.

The self-primed formulations are spin coated on 4 inch silicon wafers containing thermal oxide, on which, half of the wafer contains a thin coating of sputtered aluminum. Control formulations are also run containing no adhesion promoter. After spin coating, the films are prebaked at 75° C. for 2 minutes on a hot plate and then exposed through a test mask at a 365 nm wavelength using a 200 millijoules per square centimeter ($mJ/cm^2$) exposure dose. The image is produced using puddle development with a 32.5/67.5 solvent blend of Proglyde DMM/Isopar L. The wafers are then cured under nitrogen using the following ramped cure schedule: 5 minutes from approximately 23° C. to 100° C., 15 minutes at 100° C.; 15 minutes from 100° C. to 150° C.; 15 minutes at 150° C.; 60 minutes from 150° C. to 210° C.; 40 minutes at 210° C.

Adhesion performance is measure by microindention measurements. Results are given in Table VII.

TABLE VII

| Hydrolyzed MOPS Concentration (wt %) | Film Thickness (μm) | Adhesion to Silicon (MPa) | Adhesion to Aluminum (MPa) |
| --- | --- | --- | --- |
| 0* | 5.32 | 272.1 ± 2.9 | 70.1 ± 0.1 |
| 0* | 5.43 | 274.9 ± 2.0 | 66.5 ± 1.0 |
| 0.2 | 5.21 | 324.9 ± 3.5 | 331.9 ± 2.8 |
| 0.2 | 5.16 | 329.9 ± 4.9 | 329.5 ± 1.0 |
| 0.5 | 5.17 | 333.3 ± 5.9 | 369.3 ± 0.1 |
| 0.5 | 5.34 | 368.9 ± 0.9 | 383.0 ± 5.5 |

*Comparative Examples

Adhesion to both Silicon and Aluminum is improved with the hydrolyzed MOPS composition.

EXAMPLE 12

A partially hydrolyzed MOPS is prepared using the same conditions used in Example 1 (40 percent water). After 1 hour reaction time at 23° C., 0.20 g (0.2 weight percent) of the neat partially hydrolyzed MOPS is added to 100.0 g of the following photosensitive BCB formulation:

| 38.00 g | 1,3-bis(2-bicyclo(4.2.0)octa-1,3,5-trien-3-ylethenyl)-1,1,3,3-tetramethyl disiloxane resin |
| --- | --- |
| 0.96 g | 2,6-bis(4-azidobenzylidene)-4-ethylcyclohexanone |
| 2.15 g | 2,2-bis(4-(4-azidophenoxy)-phenyl)-propane |
| 1.71 g | (poly)-1,2-dihydro-2,2,4-trimethyl-quinoline |
| 57.18 g | mesitylene |

The adhesion promoter and photosensitive BCB solution are shaken and allowed to stand until bubbles from the agitation are gone. This produces a self-primed photosensitive formulation with 0.2 percent of the adhesion promoter.

A second self-primed photosensitive formulation with 0.5 percent of the adhesion promoter is prepared similarly by adding 0.50 g of the neat, partially hydrolyzed MOPS to a second 100.0 g sample of the photosensitive BCB formulation defined above.

The self-primed formulations are spin coated on 4 inch silicon wafers containing thermal oxide, on which, half of the wafer contains a thin coating of sputtered aluminum. Control formulations are also run containing no adhesion promoter. After spin coating, the films are prebaked at 75° C. for 2 minutes on a hot plate and then exposed through a test mask at a 365 nm wavelength using a 200 $mJ/cm^2$ exposure dose. The image is produced using puddle development with a 32.5/67.5 solvent blend of Proglyde DMM/Isopar L. The wafers are then cured under nitrogen using the following ramped cure schedule: 5 minutes from approximately 23° C. to 100° C., 15 minutes at 100° C.; 15 minutes from 100° C. to 150° C.; 15 minutes at 150° C.; 60 minutes from 150° C. to 210° C.; 40 minutes at 210° C.

Adhesion performance is measure by microindention measurements. Results are given in Table VIII.

TABLE VIII

| Hydrolyzed MOPS Concentration (wt %) | Film Thickness (μm) | Adhesion to Silicon (MPa) | Adhesion to Aluminum (MPa) |
| --- | --- | --- | --- |
| 0* | 9.91 | 442.1 ± 8.6 | 62.8 ± 0.5 |
| 0* | 9.67 | 489.6 ± 3.9 | 61.5 ± 0.3 |
| 0.2 | 9.66 | 626.4 ± 1.0 | 558.4 ± 3.7 |
| 0.2 | 9.76 | 577.8 ± 5.8 | 542.1 ± 8.6 |
| 0.5 | 9.80 | 602.0 ± 3.4 | 582.3 ± 2.9 |
| 0.5 | 9.59 | 569.6 ± 2.2 | 549.2 ± 9.6 |

*Comparative Examples

Adhesion to both Silicon and Aluminum is improved with the hydrolyzed MOPS composition.

EXAMPLE 13

The formulation preparation procedures of Example 12 are repeated using 0.2 and 0.5 percent adhesion promoter in the following dry etchable BCB formulation:

| 63.00 g | 1,3-bis(2-bicyclo(4.2.0)octa-1,3,5-trien-3-ylethenyl)-1,1,3,3-tetramethyl disiloxane resin |
| --- | --- |
| 2.63 g | (poly)-1,2-dihydro-2,2,4-trimethyl-quinoline |

-continued

| | |
|---|---|
| 34.37 g | mesitylene |

The dry etchable formulations are spin coated on 4 inch silicon wafers containing thermal oxide. Control formulations are also run containing no adhesion promoter (Comparative Examples). The wafers are then cured under nitrogen using the following ramped cure schedule: 5 minutes from approximately 23° C. to 100° C., 15 minutes at 100° C.; 15 minutes from 100° C. to 150° C.; 15 minutes at 150° C.; 60 minutes from 150° C. to 210° C.; 40 minutes at 210° C.

Adhesion performance is measured by microindention measurements. Results are listed in Table IX.

TABLE IX

| Hydrolyzed MOPS Concentration (wt %) | Film Thickness (μm) | Adhesion to Silicon (MPa) | Adhesion to Aluminum (MPa) |
|---|---|---|---|
| 0* | 9.44 | 74.1 ± 2.9 | 37.7 ± 1.5 |
| 0* | 9.64 | 79.0 ± 3.7 | 42.1 ± 0.9 |
| 0.2 | 9.57 | 174.6 ± 2.7 | 80.2 ± 0.3 |
| 0.2 | 9.41 | 127.2 ± 3.4 | 69.8 ± 0.2 |
| 0.5 | 9.57 | 144.5 ± 0.6 | 84.7 ± 0.1 |
| 0.5 | 9.58 | 129.3 ± 0.9 | 84.3 ± 4.5 |

*Comparative Examples

Adhesion to both Silicon and Aluminum is improved with the hydrolyzed MOPS composition.

EXAMPLE 14

3-Aminopropyltriethoxysilane (3-APS), (0.10 g, 0.2 weight percent) is added to 49.9 g of the same dry etchable BCB formulation of Example 13.

The adhesion promoter and dry etchable BCB solution are shaken and allowed to stand until bubbles from the agitation are gone. This produces a self-primed dry etchable formulation with 0.2 percent of the adhesion promoter.

A second self-primed dry etchable formulation with 0.5 percent of the adhesion promoter is prepared similarly by adding 0.25 g of the 3-APS to a second 49.9 g sample of the dry etchable BCB formulation.

The dry etchable formulations are spin coated on 4 inch silicon wafers containing thermal oxide, on which, half of the wafer contains a thin coating of sputtered aluminum and cured as in Example 12.

Adhesion performance is measured by microindention measurements. Results are listed in Table X

TABLE X

| Hydrolyzed MOPS Concentration (wt %) | Film Thickness (μm) | Adhesion to Silicon (MPa) | Adhesion to Aluminum (MPa) |
|---|---|---|---|
| 0* | 9.82 | 62.0 ± 1.3 | 32.8 ± 0.9 |
| 0* | 9.76 | 65.9 ± 0.2 | 32.6 ± 0.3 |
| 0.2 | 9.84 | 115.8 ± 2.2 | 35.7 ± 1.3 |
| 0.2 | 9.82 | 123.5 ± 1.7 | 36.8 ± 1.9 |
| 0.5 | 9.88 | 110.9 ± 3.7 | 50.6 ± 1.5 |
| 0.5 | 9.44 | 111.6 ± 0.9 | 41.9 ± 3.4 |

*Comparative Examples

Adhesion to both Silicon and Aluminum is improved with the 3-APS composition.

EXAMPLE 15

In preparation of the spin coating composition and substrate of this Example, the following two monomers and then polyphenylene resin solution were made as follows.

The first monomer 1,3,5-Tris(phenylethynyl)benzene was made as follows. Triethylamine (375 g), triphenyl phosphine (4.7865 g), palladium acetate (1.0205 g), and N,N-dimethyl formamide (2000 mL) were charged to a 5 liter 3-necked round bottom flask equipped with a thermocouple, an overhead mechanical stirrer, a condenser, an addition funnel, and a heating mantle with a temperature controller. This mixture was stirred for 5 minutes to dissolve the catalyst. Then diethylhydroxylamine (5 g), 1,3,5-tribromobenzene (190 g) and phenylacetylene (67.67 g) were added. The reactor was purged with nitrogen for 15 minutes, and then heated to 70° C. while maintaining a nitrogen atmosphere. After heating at 70° C. for 30 minutes, phenylacetylene (135.33 g) was slowly added dropwise over a period of about 1 hour, and the temperature increased to 80° C. Heating was continued an additional nine hours. The reaction was then cooled to room temperature and water (1 liter) was added which precipitated crude product. The product was filtered, washed three times with 500 mL portions of water, then once with 500 mL of cyclohexane. The crystals were vacuum dried at 75° C. overnight to give 226.40 g (99.1% yield) that is 97.25 area % pure by gas chromatography. The crystals were dissolved in toluene (1800 mL), refiltered through silica gel, and the solvent removed on a rotary evaporator to give 214.2 g (94.2% yield) that was 99.19 area % pure by gas chromatography. The residue was then recrystallized from a mixture of toluene (375 mL) and 2-propanol (696 mL). The white crystals were filtered, rinsed with a mixture of toluene (100 mL) and 2-propanol (400 mL), and vacuum dried at 75° C. overnight to give 1,3,5-tris(phenylethynyl)benzene (190.0 g, 83.91% yield) that is 99.83 area % pure by gas chromatography. Additional recrystallizations from toluene/isopropanol gives material of acceptable organic and ionic purity.

The second monomer 3,3'-(Oxydi-1,4-phenylene)bis(2,4,5 triphenylcyclopentadienone) herein DPO-CPD was made as follows.

First 4,4'-diphenylacetyldiphenyl ether was prepared as follows. To a slurry of aluminum chloride (97.9 g, 0.734 mol) in methylene dichloride (200 mL) at 0° C. was added, dropwise, a solution of diphenyl ether (50.0 g, 0.294 mol) and phenylacetyl chloride (102 g, 0.661 mol) in methylene chloride (50 mL), over a 30 minute period. When the addition was completed, the reaction mixture was allowed to warm to ambient temperature and stirred overnight. The reaction mixture was carefully poured, with stirring, into 1.5 kg of ice/water. Methylene chloride (1500 mL) was added to dissolve the solids and the layers were separated. The organic layer was filtered through celite, then concentrated to dryness. Recrystallization from toluene gave 110 g (92 percent) of the ether as light tan prisms.

Second 4,4'-Bis(phenylglyoxaloyl)diphenyl Ether was prepared as follows. Aqueous HBr (97 mL of a 48 weight percent solution) was added to a slurry of 4,4'-diphenylacetyldiphenyl ether (50.0 g, 0.123 mol) in DMSO (400 mL) and the resulting mixture was heated to 100° C. for two hours, then cooled to ambient temperature. The reaction mixture was partitioned between toluene (500 mL) and water (750 mL). The organic layer was washed with water (3×250 mL), followed by washing with brine, and concentration to give a viscous, bright yellow oil which solidified upon standing at ambient temperature. Recrystallization from ethanol gave 35.9 g (67 percent) of this ether as bright yellow cubes.

Then, to a nitrogen purged 5-L Morton flask equipped with a thermocouple, reflux condenser with nitrogen inlet, mechanical stirrer, and addition funnel was added, 195.4 g (0.4498 mol, 1.0 eq) 4,4'-bis(phenylglyoxaloyl)diphenyl ether, 193.9 g diphenylacetone (0.9220 mol, 2.05 eq), and 2.5 L deoxygenated ethanol. The mixture was heated to reflux, at which point a homogeneous solution was attained, and the solution was sparged with nitrogen for 30 minutes. To the addition funnel was added a solution containing 25.2 g KOH (0.4498 mol. 1.0 eq), 200 mL ethanol, and 25 mL water. The temperature was reduced to 74° C. and the KOH solution was added rapidly over 5 minutes. An exothermic reaction was quickly established and maintains reflux until three quarters of the solution was added whereafter the temperature begins to decrease. A dark purple color was observed immediately upon addition of base and solid was observed before addition was complete. After complete addition, the heterogeneous solution was heated at strong reflux for 15 minutes and much solid product was formed. The mixture was allowed to cool to 25° C. and 29.7 g glacial acetic acid (0.4948 mol, 1.1 eq.) was added and stirred for 30 minutes. The crude product was isolated by filtration and washed in the filter funnel with, 1 L water, 3 L EtOH, 2 L MeOH, and dried for 12 hours at 60° C. to 90° C. under vacuum giving 323 g (92%) crude DPO-CPD which was 94% pure by LC. The crude material was dissolved in HPLC grade methylene chloride (10 wt %), transferred to a 5-L Morton flask equipped with a bottom flush valve and mechanical stirrer, and washed vigorously for 10 to 90 minutes, 2 to 7 times with equal volume portions of low ionic water. The $CH_2Cl_2$ solution was then flashed through a 5 cm column containing 75 g of silica gel in $CH_2Cl_2$. The column was washed with an additional 1 L $CH_2Cl_2$ at which point the filtrate was essentially clear. The solution was evaporated to dryness and re-dissolved in THF and evaporated again to remove the bulk of the residual methylene chloride. The powder was transferred to a 5 L flask equipped with addition funnel and Friedrichs reflux condenser, and dissolved (0.07–0.12 g/mL) in deoxygenated HPLC THF at reflux. An additional 1 L THF was then added and a nitrogen sparge tube was inserted into the solution. The solution was sparged with nitrogen for three hours and the THF was condensed at 45° C. to 50° C. while residual methylene chloride was removed by distillation. A distillation head was attached and 700 mL to 1 L THF was removed. The solution was then allowed to slowly cool over several hours to room temperature then cooled with an ice bath to below 10° C. during which time crystallization occurs. The crystals were isolated using a 5 mm PTFE filter in a 4-L Millipore clamp-frit suction filtration flask. The crystals were then washed with 1-L MeOH and dried over night at 80° C. to 90° C. under vacuum giving 70 to 85% yield DPO-CPD with 99% LC purity, mp 270° C.

The 3,3'-( oxydi-1,4-phenylene)bis(2,4,5-triphenylcyclopentadienone) (100.0 g, 0.128 moles), low ionic 1,3,5-tris(phenylethynyl)benzene (48.3 g, 0.128 moles), and electronic gamma butyrolactone (346 g) were added to a Pyrex® 1-L 3-necked round bottom flask which had been rinsed with deionized water and HPLC grade acetone and dried. The flask was attached-to a nitrogen/vacuum inlet. The magnetically stirred solution was degassed by applying vacuum and refilling with nitrogen five times. Nitrogen gas was then allowed to flow through the headspace of the flask and exit through a mineral oil bubbler. The solution was then heated to an internal temperature of 200° C. After about 48 hours of heating the solution was allowed to cool and was transferred into a bottle made of tetrafluorethylene. Analysis of the final solution by gel permeation chromatography indicated a $M_n$=8250 and a $M_w$=29000 relative to a polystyrene standard. Analysis of the final solution by reverse phase chromatography indicated a residual 3,3'-(oxydi-1,4-phenylene) bis(2,4,5-triphenylcyclopentadienone) level of 1.8 weight percent. This solution was mixed with an amount of cyclohexanone to make the polyphenylene resin solution have a viscosity of about 17 centislote.

Vinyltriacetoxysilane(VTAS), available from Dow Corning Corp., Freeland Mich., under the product number Z-6075 was mixed with deionized water having a resistivity of 18MΩ in a ratio of 3 moles water/mole of VTAS. This mixture was stirred with a magnetic stirring bar for about 45 minutes. 0.62 parts by weight (pbw) of this hydrolyzed VTAS solution was mixed with 99.38 pbw of the polyphenylene resin solution.

An amount of the coating mixture sufficient to form a 1.5 micrometer thick coating was syringe-dispensed through a 0.1 micron filter onto a thermally-oxidized silicon wafer. Coating was carried out using an MTI spin coater and hot-plate modular track system (Machine Technology, Inc. Parsippany, N.J.). The coating was performed in the following steps: (i) the coating mixture was dispensed within 10 seconds while the wafer was rotated at 50 rpm; (ii) the wafer was rotated at 250 rpm for 3 seconds to spread the coating mixture over the wafer; (iii) the wafer was spun for 20 seconds at approximately 1500 rpm; and (iv) a backside rinse of the wafer was carried out during the spin cycle to remove the perimeter edge-bead. The back-side rinse solvent was mesitylene. Rinsing began at start of the 1500 rpm spin-cycle and continued for 6 seconds, and then ceased for the last 14 seconds to permit drying of the mesitylene solvent.

After coating, the wafer was transferred under automated control to the hot-plate module (iv) for 5 seconds of proximity-bake at a height of 0.25 centimeters and a temperature of 320° C. with a concurrent nitrogen purge of the head-space, followed by (v) a vacuum-contact bake of the wafer at 320° C. for 90 seconds under continuous nitrogen purge, followed finally by a nitrogen proximity-bake at a height of 2.25 centimeters and a temperature of 320° C. for 10 seconds to produce a gradual cool-down. The substrate and coating were then soft-cured in a Yield Engineering Systems (YES) oven under a continuous nitrogen purge. Nominal steps in the soft-curing program were: (i) to ramp in 2.5 hours from the ambient temperature to 400° C., then (ii) to hold 400° C. for 6 minutes, then (iii) to cool to a temperature below 200° C. before removing parts from the oven.

The dispensing, coating, hot-plate baking and soft curing were repeated to make a soft cured polyphenylene coating that was about 3 micrometers thick. Finally, a third layer was dispensed, spin-coated and hot-plate baked to form an about 5 micrometer thick coating which was then hard-cured (cross-linked) using the following steps in the oven program under continuous nitrogen purge: (i) ramp in 2.5 hours from the ambient temperature to 400° C.; then (ii) hold 400° C. for 20 minutes; then (iii) ramp in 30 minutes to 450° C.; then (iv) hold 450° C. for 6 minutes; then (v) cool to a temperature below 200° C. before removing parts from the oven.

The above procedure was repeated for (1) a thermally oxidized silicon wafer sputter coated with aluminum (sputter target was aluminum containing 1% by weight copper), (2) a thermally oxidized silicon wafer coated with silicon-nitride by plasma enhanced chemical vapor deposition and (3) a thermally oxidized silicon wafer coated with titanium-nitride by plasma enhanced chemical vapor deposition. For each of these coated substrates, values of bond strength were obtained from the level of delamination observed by optical microscopy subsequent to microindentation described previously. The results for each substrate are shown in Table XI.

TABLE XI

| Hydrolyzed VTAS Concentration (wt %) | Film Thickness (μm) | ADHESION BOND STRENGTH TO | | | |
|---|---|---|---|---|---|
| | | Si (MPa) | Al (MPa) | $Si_xN_y$ (MPa) | TiN (MPa) |
| 0* | 5.2 | 55 | 37 | 69 | 217 |
| 0* | 5.2 | 38 | 41 | 73 | 216 |
| 0.5 | 5.2 | 124 | 107 | 150 | 233 |
| 0.5 | 5.2 | 122 | 111 | 152 | 243 |

*Comparative Example (were made the same way as Example 15 but without any hydrolyzed VTAS)

From Table XI it is readily apparent that a substrate of the present invention may be made having a uniformly coated and well adhered coating of the crosslinked low dielectric polymer even when the substrate has two or more different materials at its surface. Whereas, in the absence of the alkoxysilane, the coated substrate of this invention is not made.

What is claimed is:

1. A composition comprising:
   a) a silane which is a hydrolyzed alkoxysilane or acyloxysilane,
   b) a solvent consisting of an organic liquid or mixture of two or more organic liquids in which component (a) and component (c) are soluble and
   c) a crosslinking prepolymer, oligomer, resin or mixtures thereof that forms a low dielectric constant crosslinked polymer that is a polyphenylene which is the reaction product of polyfunctional compound comprising cyclopentadienone functionality and acetylene functionality.

2. A composition comprising:
   a) a silane which is a hydrolyzed or partially hydrolyzed alkoxysilane or acyloxysilane,
   b) a solvent consisting of an organic liquid or mixture of two or more organic liquids in which component (a) and component (c) are soluble and
   c) a crosslinking prepolymer, oligomer, resin or mixtures thereof that forms a low dielectric constant crosslinked polymer that is a polyphenylene, wherein the silane has been hydrolyzed with from about 10 percent of a stoichiometric amount to an amount of water required for complete hydrolysis.

3. A composition comprising:
   a) a silane which is a hydrolyzed or partially hydrolyzed alkoxysilane or acyloxysilane,
   b) a solvent consisting of an organic liquid or mixture of two or more organic liquids in which component (a) and component (c) are soluble and
   c) a cross-linking prepolymer, oligomer, resin or mixtures thereof that forms a low dielectric constant crosslinked polymer that is a polyphenylene, wherein the silane has been hydrolyzed by water present in: the solvent; the crosslinking prepolymer, oligomer, resin or mixtures thereof.

4. The composition of claim 1 wherein the silane is the hydrolyzed product of a compound of the formula:

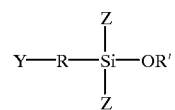

wherein R is $C_1$–$C_6$ alkylidene, $C_1$–$C_6$ alkylene, arylene, or a direct bond; Y is $C_1$–$C_6$ alkyl, $C_2$–$C_6$ alkenyl, aryl, 3-methacryloxy, 3-acryloxy, 3-aminoethylamino, or 3-amino; R' is independently in each occurrence $C_1$–$C_6$ alkyl or acyl; and Z is $C_1$–$C_6$ alkyl, $C_2$–$C_6$ alkenyl or OR'.

5. The composition of claim 4 wherein Y is 3-methacryloxy, 3-amino, 3-aminoethylamino, allyl or vinyl.

6. The composition of claim 5 wherein the compound is 3-methacryloxypropyltrimethoxy-silane, vinyl triacetoxysilane, vinyl trimethoxysilane or vinyl triethoxysilane.

7. The composition comprising:
   a) hydrolyzed or partially hydrolyzed vinyl triacetoxysilane,
   b) a solvent consisting of an organic liquid or mixture of two or more organic liquids in which component (a) and component (c) are soluble and
   (c) a crosslinking prepolymer, oligomer, resin or mixtures thereof that forms a low dielectric constant crosslinked polymer that is a polyphenylene.

8. The composition of claim 1 wherein the solvent is an aromatic hydrocarbon, an aprotic solvent, a ketone, ester, ether or mixture thereof.

9. The composition of claim 8 wherein the solvent is mesitylene, toluene, xylene, or alkylnaphthalene.

10. A composition comprising:
    a) a silane which is a hydrolyzed or partially hydrolyzed alkoxysilane or acyloxsilane,
    b) mesitylene and
    c) a crosslinking prepolymer, oligomer, resin or mixtures thereof that forms a low dielectric constant crosslinked polymer that is a polyphenylene.

11. The composition of claim 1 wherein the polyphenylene is of monomers comprising 3,3'-(oxydi-1,4-phenylene)bis(2,4,5-triphenylcyclopentadienone) and 1,3,5-tris(phenylethynyl)benzene.

12. The composition of claim 1 wherein
    the hydrolyzed alkoxysilane or acyloxysilane is from about 0.01 to about 10 weight percent,
    the solvent is from about 10 to about 99.9 weight percent, and
    the crosslinking prepolymer, oligomer, resin or mixtures thereof that forms a low dielectric constant crosslinked polymer is about 0.01 to about 90 weight percent,
    said weight percents being based on the total weight of the composition.

13. The composition of claim 12 wherein
    the hydrolyzed alkoxysilane or acyloxysilane is from about 0.2 to about 5 weight percent,
    the solvent is from about 40 to about 99.5 weight percent, and
    the crosslinking prepolymer, oligomer, resin or mixtures thereof that forms the low dielectric constant crosslinked polymer is from about 1 to about 80 weight percent,
    said weight percents being based on the total weight of the composition.

14. An article comprising
(a) a substrate that has a surface comprised of a first material that is a metal, ceramic or polymer and a second material that is (i) a metal, ceramic, or polymer and (ii) different than the first material and
(b) a coating adhered to the surface of the substrate, the coating being comprised of a crosslinked low dielectric polymer that is a polyphenylene of a crosslinking prepolymer, oligomer, resin or mixtures thereof and a silane which is a hydrolyzed alkoxysilane or acyloxysilane.

15. The article of claim 14 wherein the first material is silicon or thermally oxidized silicon and the second material is aluminum or copper.

16. The article of claim 14 wherein the surface is comprised of silicon, aluminum and at least one other material selected from the group consisting of copper, silicon nitride, titanium nitride, aluminum nitride, silica, alumina, polyimide, epoxy, polyamide, gold, platinum, silver, tungsten, chromium and nickel.

17. The article of claim 14 wherein the crosslinked polymer is of monomers comprising 3,3'-(oxydi-1,4-phenylene)bis(2,4,5-triphenylcyclopentadienone) and 1,3,5-tris(phenylethynyl)benzene.

18. The article of claim 17 wherein the silane is hydrolyzed vinyltriacetoxysilane.

19. The article of claim 14 wherein the polyphenylene is the reaction product of polyfunctional compounds comprising cyclopentadienone functionality and acetylene functionality.

* * * * *